United States Patent
Tikuisis et al.

(10) Patent No.: US 9,340,665 B2
(45) Date of Patent: May 17, 2016

(54) STABILIZED POLYETHYLENE

(71) Applicant: NOVA Chemicals (International) S.A., Fribourg (CH)

(72) Inventors: Tony Tikuisis, Calgary (CA); Kam Wah Ho, Calgary (CA); Nitin Borse, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/391,067

(22) PCT Filed: Apr. 2, 2013

(86) PCT No.: PCT/CA2013/000313
§ 371 (c)(1),
(2) Date: Oct. 7, 2014

(87) PCT Pub. No.: WO2013/159184
PCT Pub. Date: Oct. 31, 2013

(65) Prior Publication Data
US 2015/0299448 A1    Oct. 22, 2015

(30) Foreign Application Priority Data
Apr. 24, 2012   (CA) ..................... 2775294

(51) Int. Cl.
| | |
|---|---|
| *C08L 23/08* | (2006.01) |
| *C08J 3/22* | (2006.01) |
| *C08K 5/527* | (2006.01) |
| *C08L 29/04* | (2006.01) |
| *C08L 29/06* | (2006.01) |

(52) U.S. Cl.
CPC ................ *C08L 29/06* (2013.01); *C08J 3/226* (2013.01); *C08L 23/08* (2013.01); *C08L 23/0815* (2013.01); *C08J 2323/04* (2013.01); *C08J 2423/08* (2013.01); *C08J 2429/04* (2013.01); *C08K 5/527* (2013.01); *C08L 2201/08* (2013.01); *C08L 2203/16* (2013.01)

(58) Field of Classification Search
CPC ............ C08L 23/08; C08L 29/04; C08J 3/22; C08K 5/527
USPC ......................................... 524/128
See application file for complete search history.

(56) References Cited

U.S. PATENT DOCUMENTS

| | | |
|---|---|---|
| 5,844,029 A | 12/1998 | Prabhu et al. |
| 7,176,252 B2 * | 2/2007 | Stevenson ........... C07F 9/65746 252/400.24 |

OTHER PUBLICATIONS

ASTM D 1238-13: Standard Test Method for Melt Flow Rates of Thermoplastics by Extrusion Plastometer; ASTM International; pp. 1-16.

* cited by examiner

*Primary Examiner* — James J Seidleck
*Assistant Examiner* — Deve E Valdez
(74) *Attorney, Agent, or Firm* — Julie L. Heinrich

(57) ABSTRACT

Polyethylene is often stabilized with the combination of a primary antioxidant (such as a hindered phenol, a hydroxylamine or a lactone) and a secondary antioxidant (such as a phosphonite, a monophosphite, or a diphosphite). The diphosphite additives are not completely compatible with "linear" polyethylene. This results in "blooming" of the diphosphite to the surface of the finished polyethylene part or polyethylene film. The use of a preblend of ethylene vinyl alcohol (EVOH) and diphosphite mitigates this problem.

3 Claims, No Drawings

STABILIZED POLYETHYLENE

TECHNICAL FIELD

This invention relates to the use of diphosphite antioxidants in polyethylene compositions.

BACKGROUND ART

The use of antioxidants to "stabilize" polyethylene is well known. A typical antioxidant formulation contains a "primary" antioxidant (such as a hindered phenol) which is designed to protect the polyethylene against free radical attack and a "secondary" antioxidant (such as a phosphonite; a monophosphite or a diphosphite) which is designed to quench hydroperoxides. For many applications, a simple mono-phosphite provides adequate performance as the secondary antioxidant.

Diphosphites may be used in more demanding applications—particularly where the polyethylene is exposed to a prolonged period of high temperature during the processing/conversion operations that are used to convert the polyethylene into a finished product.

Diphosphite antioxidants—as the name implies—contain two phosphorus atoms. It is generally known that these molecules are not completely compatible with linear polyethylene. In particular, the diphosphite is observed to migrate through the finished polyethylene product and form a thin coating on the surface of the product. This surface coating is highly undesirable for some products—especially films that are further processed in subsequent operations. For example, some polyethylene film is stretched when used to form a package (e.g. stretch wrap or pallet wrap) and the surface layer of diphosphite can impair the performance of the machine that stretches the film.

DISCLOSURE OF INVENTION

We have developed a process to reduce the rate that diphosphite antioxidants migrate through polyethylene. Thus, in one embodiment, this invention provides:
a stabilized polyethylene composition comprising:
  A) a linear polyethylene copolymer that is characterized by having:
    i) a melt index, $I_2$, of from 0.1 to 20 grams per 10 minutes; and
    ii) a density of from 0.890 to 0.955 g/cc; and
  B) an EVOH/diphosphite preblend comprising:
    a) from 30 to 90 weight % of a thermoplastic ethylene vinyl alcohol copolymer; and
    b) from 10 to 70 weight % of a diphosphite antioxidant,
    wherein said weight % figures are based on the total weight of ethylene vinyl alcohol copolymer plus diphosphite; and
    wherein said EVOH/diphosphite preblend is:
    1) dispersed within said polyethylene composition and
    2) present in an amount that is sufficient to provide form 200 to 2,000 parts per million by weight of said diphosphite, based on the total weight of said polyethylene composition.

This invention uses a "preblend" of the diphosphite with a thermoplastic ethylene-vinyl alcohol ("EVOH") copolymer. The preblend is prepared first and then melt mixed with the polyethylene. While not wishing to be bound by theory, it is believed that the EVOH acts as an emulsifier or compatibilizer for the diphosphite in the final polyethylene composition. For clarity, the "preblend" step is essential to this invention—i.e. the invention does not encompass a simple blend in which the entire composition of this invention is mixed together in a single mixing step. However, as disclosed in the examples, the preblend may also optionally contain some polyethylene. The inclusion of polyethylene in the preblend facilitates the preparation of the preblend and the subsequent incorporation of the preblend into the first polyethylene composition. When polyethylene is included in the preblend, the total amount should be relatively small (from about 1 to 10 weight % of the total polyethylene used in the overall polyethylene composition) and is preferably the same type of linear polyethylene copolymer that is used for the remainder of the polyethylene composition.

Thus, two mixing steps are required—one initial mixing step to produce a "preblend", followed by a second mixing step where the preblend is mixed into the bulk polyethylene.

In another embodiment, the present invention provides a process to prepare stabilized polyethylene composition, said process comprising:
  I) preparing an EVOH/diphosphite preblend by melt mixing a blend of
    a) from 30 to 90 weight % of a thermoplastic ethylene vinyl alcohol copolymer; and
    b) from 10 to 70 weight % of a diphosphite antioxidant, under conditions of sufficient shear and temperature to melt said ethylene vinyl alcohol copolymer and disperse said diphosphite antioxidant within said ethylene vinyl alcohol copolymer and
  II) melt mixing said preblend with a linear polyethylene copolymer that is characterized by having
    i) a melt index, $I_2$, of from 0.1 to 20 grams per 10 minutes; and
    ii) a density of from 0.890 to 0.955 g/cc;
    wherein said EVOH/diphosphite preblend is contained within said polyethylene composition in an amount that is sufficient to provide from 200 to 2,000 parts per million by weight of said diphosphite.

BEST MODE FOR CARRYING OUT THE INVENTION

The term "linear polyethylene" generally refers to a polyethylene that is prepared with a transition metal catalyst. This definition does encompass a wide variety of commercially available polyethylene products but it excludes a type of polyethylene that is prepared with a free radical initiator (such as a peroxide). The excluded type of polyethylene is typically referred to as "high pressure/low density" polyethylene.

The term "linear polyethylene copolymer" further requires that the polyethylene is a copolymer of ethylene with at least one other alpha olefin such as butene, pentene, hexene, heptene, or octene.

The linear polyethylene copolymers used in this invention have a melt index, "$I_2$", as determined by ASTM D 1238 (using a 2.16 kg weight, at a temperature of 190° C.) of from 0.1 to 20 grams per 10 minutes (preferably from 0.3 to 10 grams per 10 minutes) and a density of 0.890 to 0.955 grams per cubic centimeter (g/cc), preferably from 0.900 to 0.940 g/cc.

The linear polyethylenes may be produced in any of the known polymerization processes (such as a gas phase process, a slurry process or a solution process) using any known polymerization catalyst that contains a transition metal (such as a chromium catalyst, a Ziegler Natta catalyst or a single site catalyst such as a metallocene catalyst or a so-called "constrained geometry catalyst".

EVOH

Ethylene-vinyl alcohol copolymer ("EVOH") is a well-known item of commerce and are catalogued in the Chemical Abstracts database as CAS No. 26221-27-2. Preferred EVOH copolymers for use in the present invention have a density of from 1.14 to 1.20 g/cc; a melt index, $I_2$, of from 1 to 10 and contain from about 25 to 50 mole % ethylene. Such EVOH copolymers are sold under the trademark EVAL by Kuraray.

Diphosphite

As used herein, the term diphosphite refers to a phosphite stabilizer which contains at least two phosphorus atoms per phosphite molecule.

Non-limiting examples of suitable diphosphites and diphosphonites follow: distearyl pentaerythritol diphosphite, diisodecyl pentaerythritol diphosphite, bis(2,4 di-tert-butylphenyl)pentaerythritol diphosphite [sold under the Trademark ULTRANOX 626, by Chemtura Corporation]; bis(2,6-di-tert-butyl-4-methylpenyl)pentaerythritol diphosphite; bisisodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, and bis(2,4-dicumylphenyl)pentaerythritol diphosphite [sold under the Trademarks DOVERPHOS S9228-T and DOVERPHOS S9228-CT by Dover Chemicals Corporation]. The diphosphite is used in amounts of from 200 ppm to 2,000 ppm, preferably from 300 to 1,500 ppm and most preferably from 400 to 1,000 ppm.

Other Additives

The compositions of this invention may optionally include other additives that are conventionally used with polyethylene. A non-limiting list follows.

Acid Neutralizers

Many commercially available polyolefins contain chloride residues. These chloride residues may generate hydrochloric acid, particularly during melt processing operations. Accordingly, an "acid neutralizer" is conventionally included in a polyolefin stabilization package and is preferably included in the process of this invention.

These acid neutralizers may be divided into "Inorganic"—such as zinc oxide, synthetic hydrotalcites and Li, Na, Ca or Al (hydroxy) carbonates; and "Organic"—such as salts of fatty acids or their derivatives including calcium stearate, zinc stearate, calcium lactate and calcium stearoyl lactylate.

When employed, these conventional acid neutralizers are used in conventional amounts. It is preferred to use a synthetic hydrotalcite (in an amount of from 100 to 1,000 ppm), zinc stearate (in an amount of from 200 to 700 ppm) or calcium stearoyl lactylate (in an amount of from 200 to 700 ppm). A combination of a hydrotalcite with an "organic" acid neutralizer is highly preferred.

HALS

A hindered amine light stabilizer (HALS) is preferably included in the stabilizer package used in the present invention if the plastic part is intended for more than single/short term use.

HALS are well known to those skilled in the art.

When employed, the HALS is preferably a commercially available material and is used in a conventional manner and amount.

Commercially available HALS include those sold under the trademarks CHIMASSORB 119; CHIMASSORB 944; CHIMASSORB 2020; TINUVIN 622 and TINUVIN 770 from BASF (formally Ciba Specialty Chemicals Corporation), and CYASORB UV 3346, CYASORB UV 3529, CYASORB UV 4801, and CYASORB UV 4802 from Cytec Industries. TINUVIN 622 is preferred. Mixtures of more than one HALS are also contemplated.

Suitable HALS include: bis(2,2,6,6-tetramethylpiperidyl)-sebacate; bis-5(1,2,2,6,6-pentamethylpiperidyl)-sebacate; n-butyl-3,5-di-tert-butyl-4-hydroxybenzyl malonic acid bis (1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Phenolic Antioxidants

Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonyl-phenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methyl-benzyl)-6-tert-butyl-4-methylphenyl)terephthalate; and other phenolics such as monoacrylate esters of bisphenols such as ethylidiene bis-2,4-di-t-butylphenol monoacrylate ester.

Fillers and Reinforcing Agents

For example, calcium carbonate; silicates; glass fibers; asbestos; talc; kaolin; mica; barium sulfate; metal oxides and hydroxides; carbon black and graphite.

Other Miscellaneous Additives

For example, plasticizers; epoxidized vegetable oils, such as epoxidized soybean oils; lubricants; emulsifiers; polymer process additives (e.g. fluoroelastomers); pigments; optical brighteners; flameproofing agents; anti-static agents; blowing agents and thiosynergists, such as dilaurythiodipropionate or distearylthiodipropionate.

Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) may also be employed.

Lactones

Lactones such as benzofuranone (and derivatives thereof) or indolinone (and derivatives thereof).

Melting Processing Operations

In general, any mixing/melt processing operation that is suitable for polyolefins, may be used to prepare the composition of this invention. The mixing operations are conducted at temperatures from above the melting point of the linear polyethylene copolymer to as high as 400° C. The use of an extruder (single screw or twin screw) is preferred.

Uses of Compositions of this Invention

The stabilized polyethylene compositions of this invention are especially suitable for the manufacturing of extruded film. Examples of polyethylene film extrusion process include the blown film process and cast film process which is briefly described below.

In a blown film process, the polyethylene is melted in a screw extruder (preferably at a temperature of from 200 to 290° C., especially from 210 to 250° C.) and then forced through an annuler die to form a tube of molten polyethylene. The tube is inflated with air from the interior of the tube, then cooled and finally flattened by nip rolls. It is also known to co-extrude multi layers of film by this process.

In a cast film process, the polyethylene is also melted in a screw extruder (preferably at temperatures of from 450° F. (232° C.) to 600° F. (316° C.) especially from 500° F. (260° C.) to 550° F. (288° C.) and then forced through a flat die. The molten polyethylene web is then cooled (typically, through the use of a water bath or, alternatively, temperature controlled casting rolls).

The compositions of this invention may also be used for molding. In an injection molding process, the polyethylene is typically melted in a screw extruder and then rammed under very high pressures into a hollow mold.

In a rotomolding process, the polyethylene resin is ground into a fine powder, then charged into a hollow mold. The mold is then placed in a furnace and heated to temperatures of from 250° C. to 325° C. (especially from 520° F. (271° C.) to 600° F. (316° C.)) while the mold is rotated. The molten plastic flows through the mold under the gentle (low shear) forces from the rotation.

Examples

Background

"Classic" Test Method for Additive Migration

The migration of additives through polyolefins has been the subject of considerable research. In one prior art method for measuring the solubility of an additive in polyethylene, stacks of compression-molded plaques of polyethylene are placed on both sides of a plaque that is heavily loaded with a "reservoir" of the additive that is being studied. The plaques are made by compression molding of solvent-washed polyethylene powder. The concentration of additive in the reservoir is typically about 5 weight %. The whole package is then wrapped with aluminum foil and tightly clamped together. The package was aged at 50° C. for 56 days. At the end of aging, the plaques are cooled to room temperature, surface cleansed with solvent, and analyzed for additive.

The concentration of additive in the outer layers on both sides of the reservoir is averaged and assumed to be representative of the solubility of the additive in the polyethylene. The validity of the method is based on the assumption of perfect contact between plaques, total freedom of movement/migration of additive from one plaque to the next, and that there is sufficient time for equilibrium concentrations of the additive to be reached.

New Test Method

General

The "classic" test method described above uses injection molded plaques that are much thicker than conventional polyethylene film and, accordingly, may not be completely representative of migration through thin layers. In addition, the classic test method may produce errors that result from imperfect contact between the plaques, particularly if the plaques are warped.

Accordingly, we developed a new test method that uses a three layer co-extruded film. The central layer of the film contains a "reservoir" of the diphosphite. A very high concentration (typically, 2 weight %) of the diphosphite was used in the "reservoir". One external layer was made with a homopolymer polyethylene ("HDPE"). The solubility of diphosphite in HDPE is very low. Thus, the HDPE layer may be considered to be a "barrier" because the additive does not migrate to it in any substantial amount. The second external layer was made with a linear polyethylene copolymer. This three layer structure allows the study of the additive in the "reservoir" through to the linear copolymer being studied. Several different three layer films (using different copolymers in the second external layer) were used in order to study the migration of the diphosphite from the internal reservoir, through the second external layer. The three layer films were allowed to "age" at 60° C. and the migration of the diphosphite to the surface of the second layer was measured and recorded as a function of ageing time. (Surface measurements or the "first" or HDPE layer confirmed that little or no migration of the diphosphite through the HDPE layer was detectable).

The amount of diphosphite on the surface of the film was determined by Fourier Transform Infra Red (FTIR) absorption. A peak at 835 am$^{-1}$ was used for the diphosphite sold under the trademark Doverphos 9228.

The apparent rate of diffusion through different types of linear ethylene copolymer can be compared qualitatively by examining the slope of the curve (showing surface diphosphite concentration as a function of time).

The diffusion coefficient may also be quantitatively estimated by equation (1):

$$\ln\left(1 - \frac{A_t}{A_\infty}\right) = \ln\left(\frac{4}{\pi}\right) - \frac{D\pi^2}{4L^2}t, \quad (1)$$

where $A_t$ is the peak ratio (or concentration per unit area) at time t (second), $A_\infty$ is the plateau peak ratio (or concentration per unit area), L is the layer thickness in cm, t is time and D is the diffusion coefficient in cm$^2$/second.

The estimated diffusion coefficients of the diphosphite through different linear polyethylene copolymers at 60° C. are listed in Table 1. In general, the diffusion coefficients decrease with increasing density of the polyethylene matrix.

TABLE 1

Diffusion Coefficients of Diphosphite

| Polyethylene Resin | Melt Index ($I_2$) | Density (g/cm$^3$) | Diffusion Coefficient cm$^2$/s |
|---|---|---|---|
| PEC-1 | 4.0 | 0.917 | $7 \times 10^{-11}$ |
| PEC-2 | 2.4 | 0.920 | $5 \times 10^{-11}$ |
| PEC-3 | 2.6 | 0.936 | $5 \times 10^{-11}$ |
| PEC-4 | 3.5 | 0.943 | $6 \times 10^{-11}$ |

PEC = polyethylene copolymer

The data in Table 1 illustrate that the diphosphite additive readily migrates through polyethylene copolymers. This migration causes the diphosphite to "bloom" to the surface of finished polyethylene products. The surface bloom can cause problems for end users of the products. Most notably, polyethylene film that has this surface bloom can be difficult to "stretch" when used in stretch wrap applications. Firstly, the surface bloom collects on various surfaces of machinery used to handle the film (a phenomenon that is generally referred to as "dusty") and ultimately, the accumulation of the "diphosphite dust" can prevent the machines from "stretching" the film to a desired level of elongation.

We have now found that this problem can be mitigated by preparing a "preblend" of the diphosphite with ethylene-vinyl alcohol ("EVOH"). In the first part of this study, a preblend was prepared by melt mixing 92 weight % of polyethylene copolymer, 6 weight % EVOH and 2 weight % diphosphite.

This preblend was used to prepare the central layer of a three layer cast film, using the "new" test method described above. Thus, this preblend provided a "reservoir" layer that contained about 2% diphosphite and 6% EVOH. The reservoir layer was sandwiched between 1) a barrier layer of HDPE; and 2) the polyethylene copolymer that was being studied.

The polyethylene used in this experiment had a melt index of 2 and a density of 0.920 g/cc. This type of polyethylene is commonly used to prepare "stretch wrap film".

The first EVOH used in this study was a commercially available material sold under the trademark "EVAL" H171B by Kuraray Industries. The three layer film was then subjected to an ageing test at 60° C. and the level of diphosphite that bloomed to the surface of the polyethylene copolymer was measured at different time intervals.

A second three layer film was then prepared using a different commercially available EVOH copolymer (sold under the trademark EVAL LC 151B). This film was also subjected to an ageing study. The rate of diphosphite migration/bloom was greatly reduced through the use of the EVOH/diphosphite preblend (in comparison to film made without EVOH).

Inventive Example

A polyethylene composition according to this invention was prepared by melt mixing about 7 weight % of the EVOH/diphosphite preblend (from Part C) with 93 weight % of the polyethylene copolymer PEC-2, thereby providing a blend composition containing approximately 1400 parts per million by weight of the diphosphite.

A three layer cast film according to this invention was then prepared using this composition (i.e. each layer was made from the same blend composition).

A comparative three layer film was prepared in a similar manner (except that no EVOH was used in the preparation of the comparative film).

Three layer cast films were prepared from the inventive and comparative compositions. For clarity: all three layers of the inventive cast film were prepared with the same inventive composition (which contains the EVOH) and all three layers of the comparative cast film were prepared with the same comparative composition (which does not contain EVOH). The resulting cast films were subsequently processed on film stretching equipment (sold under the trademark HiLiter).

The comparative film showed high levels of "dusting" when processed on the HiLiter stretching equipment. "Dusting" is qualitatively observed by a build-up of diphosphite-containing dust on the rollers of the stretching equipment.

In contrast, the inventive film was observed to produce noticeably lower levels of dusting.

INDUSTRIAL APPLICABILITY

An improved stabilized system for polyethylene comprises a blend of ethylene-vinyl alcohol (EVOH) copolymer with a diphosphite. The stabilized polyethylene composition is suitable for the manufacture of a wide variety of extruded goods, especially polyethylene film.

The invention claimed is:

1. A process to prepare stabilized polyethylene composition, said process comprising:
   I) preparing an EVOH/diphosphite preblend by melt mixing a blend of
      a) from 30 to 90 weight % of a thermoplastic ethylene vinyl alcohol copolymer; and
      b) from 10 to 70 weight % of a diphosphite antioxidant, under conditions of sufficient shear and temperature to melt said ethylene vinyl alcohol copolymer and disperse said diphosphite antioxidant within said ethylene vinyl alcohol copolymer, and
   II) melt mixing said preblend with a linear polyethylene that is characterized by having
      i) a melt index, I2, of from 0.1 to 20 grams per 10 minutes; and
      ii) a density of from 0.890 to 0.955 g/cc; and
      wherein said EVOH/diphosphite preblend is contained within said polyethylene composition in an amount that is sufficient to provide from 200 to 2,000 parts per million by weight of said diphosphite.

2. The process of claim 1 wherein said linear polyethylene has a melt index, $I_2$, of from 0.3 to 10 grams per 10 minutes and said thermoplastic ethylene vinyl alcohol copolymer contains from 25 to 50 mole % ethylene.

3. The process of claim 1 wherein said diphosphite is selected from the group consisting of bis(2,4 di-tert-butylphenyl)pentaerythritol diphosphite; bis(2,6-di-tert-butyl-4-methylpenyl)pentaerythritol diphosphite; and bis(2,4-dicumylphenyl)pentaerythritol diphosphite.

* * * * *